United States Patent Office 3,832,209
Patented Aug. 27, 1974

3,832,209
DISPERSION COMPRISING PIGMENT, ORGANIC LIQUID AND POLYMERIC DEFLOCCULATING AGENT
Elizabeth Ann Baker, Glen Iris, Victoria, David Jankiel Wluka, Balaclava, Victoria, and Howard William Tankey, Box Hill North, Victoria, Australia, assignors to Imperial Chemical Industries of Australia and New Zealand Limited, Victoria, Australia
No Drawing. Continuation of abandoned application Ser. No. 143,246, May 13, 1971. This application June 20, 1973, Ser. No. 371,879
Claims priority, application Australia, May 26, 1970, 1,323/70
Int. Cl. C08h 17/00; C09c 3/02
U.S. Cl. 106—308 Q          11 Claims

ABSTRACT OF THE DISCLOSURE

A dispersion comprising a pigment, an organic liquid and a polymeric deflocculating agent comprising a backbone chain having incorporated in, or dependent from it, firstly a group of internal salt structure and secondly a solubilizing group.

---

This is a continuation of application Ser. No. 143,246 filed May 13, 1971 and now abandoned.

This invention relates to dispersions of pigments in organic liquids.

Dispersions of pigments in liquid organic media comprising solutions or dispersions of film-forming polymer are used as paints, lacquers and printing inks. In these compositions it is desirable that the pigment particles are deflocculated, that is, the particles be present as discrete, individual particles in the liquid organic medium, and should not aggregate.

When pigments are dispersed in organic liquid media, suspensions are frequently formed exhibiting some degree of aggregation of the pigment particles. Certain materials, for example, soya lecithin and metal soaps of fatty acids, have been proposed as additives to limited pigment flocculation. However, in many systems, such as solutions of addition copolymers in organic liquids, satisfactory deflocculated dispersions of pigment cannot be readily prepared. Thus, for example, titanium dioxide pigment forms a highly flocculated dispersion in a solution comprising poly(methyl methacrylate).

We have now found that certain polymers comprising internal salts are unexpectedly effective as pigment deflocculating agents.

Accordingly we provide a dispersion comprising a pigment, an organic liquid and a polymeric deflocculating agent comprising a backbone chain having incorporated in, or dependent from, it, firstly a group of internal salt structure and secondly a solubilising group as hereinafter defined.

The nature of the organic liquid used in preparing the dispersions of our invention is not narrowly critical. The organic liquids normally used in the preparation of conventional dispersions of pigments may be used. Thus suitable organic liquids include saturated hydrocarbons such as aliphatic or alicyclic hydrocarbons; aliphatic oxygen containing organic liquids, for example, alcohols, ketones, esters and ethers; and aromatic hydrocarbons; or mixtures thereof.

The function of the backbone chain is essentially that of a supporting structure for the solubilising group and the group of internal salt structure. Consequently the nature of the arrangement of the atoms forming the chain is not narrowly critical. Thus the chain may consist of carbon atoms alone, carbon atoms linked with one or more hetero atoms, in particular oxygen, nitrogen, sulphur, phosphorus, silicon and boron; alternatively it may consist of a series of alternating pairs of P-O groups, Si-O groups or B-O groups. The backbone may be linear, slightly or highly branched, or cross-linked, provided however, that the resultant deflocculating agent remains soluble in the organic liquid. Convenient backbones may be inorganic and, preferably, organic polymer chains; a wide range of polymers is useful as backbones, the principal limitation being that they must be capable of including a sufficient number both of the solubilising groups as hereinafter defined and of the groups of internal salt structure.

The backbone may be formed from addition polymers, e.g. polyalkylenes, which may if desired bear substituents other than those above defined provided these further substituents do not interfere with the solvation and salt forming properties of the solubilising groups and of the groups of internal salt structure. The type of such further substituents depends on the monomer unit used to build up the backbone. Suitable backbones are the carbon to carbon chains in polystyrene, polyvinyl chloride, polyvinyl alcohol, poly-alpha-beta-ethylenically unsaturated carboxylic acid derivatives particularly substituted and unsubstituted polyacrylates, e.g. polymethyl methacrylate or polyacrylic acid; another group of suitable polymeric backbones are the condensation products of dicarboxylic acids with diols, dicarboxylic acids with diamines, polyurethanes comprising the reaction products of diisocyanates with reactive hydroxyl group containing diols, polyethers, polyesters or polyamides; epoxy resins, polyethers, polyamines, polyureas, polysulphides, polyimides, polysulphones, polyoxyalkylenes, polyacetals and alkyd resins. As above stated, it is, however, understood that the deflocculating agents derived from said backbones must remain soluble in the organic liquid and that the backbone must be capable of including a plurality of each of the solubilising group and the group of internal salt structure. The backbones derived from addition polymers may be made by homopolymerisation or copolymerisation.

The solubilising group is characterised by its ability to be solvated by the organic liquid used in the manufacture of the pigment dispersion. A group is usually capable of being solvated if its composition is identical with or chemically closely related to the composition of the organic liquid. A test for selecting suitable solubilising groups is that the compound, resulting from conversion of the solubilising group into a separate molecule bearing on the atom bridging it to the backbone a hydrogen atom or a low molecular weight radical, e.g. methyl or acetyl, must be readily soluble in the organic liquid. By "readily soluble" we mean having a solubility in excess of 20% by weight, preferably in excess of 50% by weight, most preferably completely miscible in the organic liquid.

For example, when the organic liquid is a saturated hydrocarbon, suitable solubilising groups attached to the backbone directly or through linking groups are substituted or unsubstituted long chain alkyl groups. By "long chain" we mean chains of more than six carbon atoms, e.g. 2-ethylhexyl, dodecyl, hexadecyl, stearyl or poly(12-hydroxy stearic acid) condensates.

Alkyl groups are also suitable solubilising groups for aliphatic oxygen-containing organic liquids but in this case the alkyl chains should contain more than four carbon atoms.

Additional suitable solubilising groups for use with aliphatic oxygen-containing organic liquids, such as alcohols and ketones, are for example groups containing polyalkoxides prepared from monomers such as ethylene oxide, propylene oxides or butylene oxides, or are for example groups containing alcohols, ketones or derivatives of ketones formed by the reaction of formaldehyde with ketones. These oxygen-containing solubilising groups may also be used with aromatic organic liquids. Additional suitable solubilising groups for use with aromatic organic liquids are phenyl and benzyl groups derived from aromatically substituted ethylenically unsaturated monomers such as styrene and vinyl toluene.

The above examples illustrate suitable solubilising groups but do not limit the scope of the invention.

The internal salt structure may be incorporated in the backbone chain. In this case the backbone chain contains one or more of the following groups:

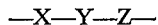

wherein X is a cation, Z is an anion and Y is any suitable linking group. Suitable groups X are, for example ammonium, sulphonium and phosphonium groups, preferably.

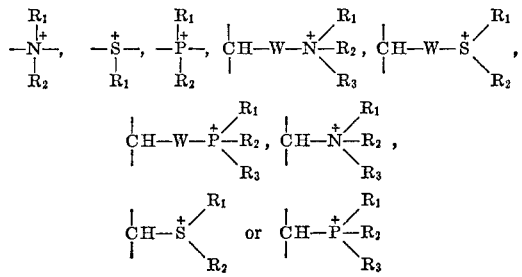

wherein W, $R_1$, $R_2$, $R_3$ are as defined herein below. Suitable groups Z are acid residues, preferably.

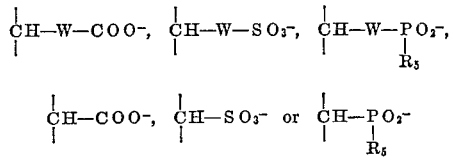

wherein W is any suitable linking group; $R_1$, $R_2$, $R_3$, separately, is hydrogen, alkyl, aryl, aralkyl, alkenyl or acyl, two of which may be joined together to form a ring; $R_5$ is $-OR_6$, $R_6$, or $-O^-$; $R_6$ being either alkyl or aryl, and wherein there may be two cations X to each dianion Z, whenever $R_5$ is $-O^-$. The exact nature of X, Y and Z is not narrowly critical.

Alternatively the internal salt structure may be dependent from the backbone chain. In this case the backbone chain contains one or more of the following groups:

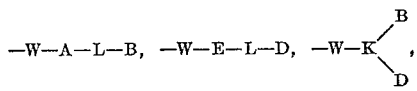

wherein A and D are cations, B and E are anions and W, L and K are any suitable linking groups as defined hereinbelow.

A may be for example, ammonium, sulphonium or phosphonium groups, preferably:

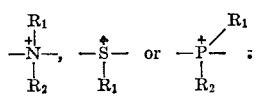

B may be for example, an acid residue, preferably,

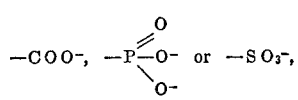

except that when A is

B can not be $-SO_3^-$.

E may be for example an acid residue, preferably

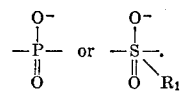

D may be, for example, ammonium, sulphonium or phosphonium groups, preferably

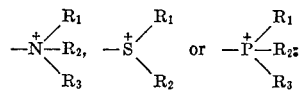

$R_1$, $R_2$ and $R_3$ are as defined hereinbefore. Suitable linking groups Y, W and L, are non-polar and capable of forming two covalent bonds for example $-O-$, $-S-$, $-CH_2-CH_2-$ or $-CH_2-$. Suitable linking group K is non-polar and capable of forming three covalent bonds, for example,

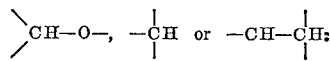

The exact nature of the linking groups is not narrowly critical.

We have also found polymeric deflocculating agents of use in our invention wherein the group of internal salt structure is a group containing both an acidic residue and a radical selected from the group consisting of amino, phosphino or mercapto.

The degree of ionisation of the polymeric deflocculating agents used in our invention is not critical and the agents remain effective under conditions of pH wherein the acidic residue and/or the amino, phosphino or mercapto groups if present is undissociated.

Accordingly we provide a dispersion comprising a pigment, an organic liquid and a polymeric deflocculating agent comprising a backbone chain having incorporated in, or dependent from it, firstly a solubilising group and secondly a group selected from the group consisting of $-X-Y-Z-$, $-W-A-L-B$, $-W-E-L-D$ and

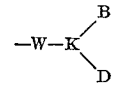

wherein X, A and D, separately, is ammonium, phosphonium, sulphonium, amino, phosphino or mercapto groups; Z, B and E separately is an acid or acid salt but when A is ammonium, B cannot be $-SO_3^-$; Y, W, L and K are linking groups.

Preferably the polymeric deflocculating agent comprises the group $-X-Y-Z-$ wherein X is selected from the group consisting of

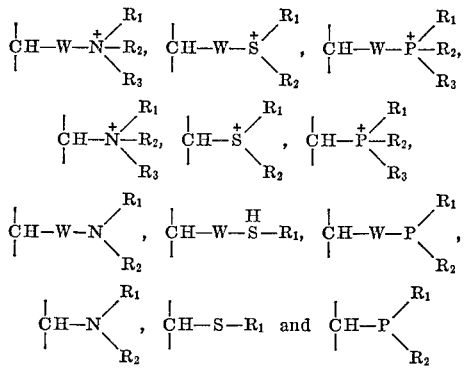

and wherein Z in selected from the group consisting of

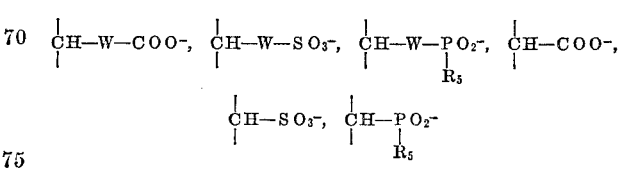

and wherein Y and W, separately, is a non-polar linking group capable of forming two covalent bonds; $R_1$, $R_2$, $R_3$, separately, is hydrogen, alkyl, aryl, aralkyl, alkaryl or aryl, two of which may be joined together to form a ring; $R_5$ is $OR_6$ or $R_6$, $R_6$ being either alkyl or aryl.

In practice it is convenient to make the backbone of the deflocculating agents by polymerising or, in the case of addition copolymers, by copolymerising, the mer-units of the polymer which bear sites capable of reacting with one or both of the desired types of substituents; alternatively mer-units of the polymer may already bear a suitable substituent of a solubilising group and/or a group of internal salt structure prior to polymerisation.

The deflocculating agents may be prepared by methods well established in the art by copolymerisation of comers containing solubilising groups and comers which either contain internal salts or contain a structure from which the internal salt may be formed. Two or more different comers may be required for the formation of an internal salt in the final polymer.

Conventional addition polymerisation initiators, chain transfer agents and techniques, including for example, skew feeding of monomers may be used. It is convenient to carry out the polymerisation in the presence of a solvent for the polymer.

When the polymer is prepared by the copolymerisation of a mixture of comers comprising a comer containing the solubilising group or to which the solubilising group may be later attached and comers containing a group of internal salt structure or to which a group of internal salt structure may be later attached, comers containing a solubilising group or to which a solubilising group may be attached should predominate in the mixture of comers. The molar percentage in the mixture of the comers containing the solubilising group or to which the solubilising group may be later attached should preferably be between 99 and 50. A mixture of different solubilising groups may be used.

The total molar percentage in the mixture of the comer or comers containing the internal salt group or to which the internal salt group may be later attached, should preferably be between 1 and 50.

The molecular weight of our polymeric deflocculating agents lies between 2,000 and 500,000, preferably between 5,000 and 100,000. The comer containing the solubilising group is such as to be soluble in the particular solvent in which the pigment is to be dispersed. For hydrocarbon solvents suitable comers are, for example, the long chain alkyl esters of acrylic, methacrylic, crotonic and other reactive olefinic acids, and the vinyl esters of long chain carboxylic acids. By "long chain" we mean chains of more than six carbon atoms, e.g. 2-ethylhexyl, dodecyl, hexadecyl or stearyl.

Thus, examples of suitable comers containing a solubilising group for saturated hydrocarbons are lauryl acrylate, 2-ethylhexyl acrylate, 2-ethylhexyl methacrylate, vinylstearate, tetradecylcrotonate, octadecyl methacrylate and glycidyl methacrylate condensates of 12-hydroxy stearic acid.

The nature of the pigment to be used in the dispersion is not critical and the following are examples of suitable materials:

(i) inorganic pigments, e.g. titanium dioxide, oxides and hydrated oxides of iron, lead chromates, zinc chromate and Prussian Blue;
(ii) extender pigments, e.g. barytes, silica, whiting, blanc fixe, alumina and the aluminium silicates; and
(iii) organic pigments, e.g. azo, vat, quinacridone and phthalocyanine pigments.

The dispersion may be prepared by grinding together, preferably under high-speed mechanical stirring, the pigment, organic liquid and deflocculating agent.

Accordingly we provide a process of manufacture of a pigment dispersion, which process comprises grinding a mixture comprising an effective amount of polymeric deflocculating agent, pigment and organic liquid. The maximum concentration of deflocculating agent to be used is not critical, although it is not economic to use an excess over that required for a particular application. The minimum concentration is, at least in part, related to the specific surface area of the pigment. The actual—optimal or most economical—amount of deflocculating agent to be used with a particular pigment/organic liquid system is readily determined by simple experiment. Incremental additions of deflocculaing agent are made to the system until the desired level of deflocculation is attained. The invention is not limited to the preparation of fully deflocculated dispersions as for many purposes it is not necessary nor economically desirable to prepare a fully deflocculated system.

In practice, we have found that the amount of deflocculating agent required to give satisfactory dispersions is between 0.001 and 0.05 grams of solid deflocculating agent for every 10 square metres of pigment surface area.

Alternatively we provide a process of manufacture of a pigment dispersion, which process comprises grinding a mixture comprising a pigment, an effective amount of deflocculating agent, inorganic base and organic liquid. The inorganic base may be an alkaline earth, or alkali, metal hydroxide, for example, calcium hydroxide or sodium hydroxide. We believe that the deflocculating agent in these dispersions comprises an internal salt structure wherein the basic group is not quaternised and the acid group is the salt of the alkaline earth, or alkali metal. The amount of base added is not critical but we prefer to use substantially equimolar amounts of base and polymeric deflocculating agent.

We have found that the pigment dispersions prepared from pigment particles coated with the polymeric deflocculating agent have improved properties.

Accordingly we provide a process of preparing a pigment dispersion which process comprises firstly, coating the pigment with a polymeric deflocculating agent as hereinbefore described and secondly, grinding together a mixture comprising the coated pigment, an organic liquid, optionally inorganic base and optionally water.

The dispersions of this invention are of use, for example, as concentrated tinting bases for paints and printing inks. For this application we prefer to use deflocculating agents in which the concentration of internal salt groups approaches the upper limit of our preferred range. It is a particular advantage of our invention that these deflocculating agents are usually accepted by a wide range of film-forming vehicles, thus providing unusually versatile tinting bases; in particular they provide a convenient route to the preparation of deflocculated pigment dispersions in solutions of addition polymers in organic liquids. The concentration of pigment in certain cases may be as much as 40–60% by volume; consequentlly our invention affords an increase in production capacity of dispersing equipment, and the dispersions require less space for storage.

In a further embodiment of our invention, using a film-forming deflocculating agent, the deflocculating agent may provide the whole or part of the film-forming polymer of a paint. That is, a dispersion of pigment in an organic liquid and deflocculating agent, optionally in the presence of a minor proportion of additional film-forming polymer, when applied as a film to a substrate and allowed to dry in air, forms on the substrate a coherent decorative and/or protective coating. In this application we have found it preferable to use low concentrations, i.e. approaching the minimum concentration limit of internal salt groups in the deflocculating agent, which is itself used in the dispersion in relatively high proportions, for example, the pigment volume concentration based on the total solids content of the dispersion may be from 8 to 25%, and the deflocculating agent volume concentration based on the total solids content of the dispersion may be as high as 92%.

The activity of the deflocculating agents is in some cases improved by the presence of a small amount of water in the dispersion. Under such circumstances we prefer the amount of water in the dispersion to be in the range from 0.05 to 5% w./w. inclusive more preferably in the range from 0.5 to 2% w./w. inclusive. In dispersions prepared from commercially available materials there is normally sufficient water present but, if dried materials are used, additional water may be added with advantage. In certain cases the activity of the deflocculating agents improves on keeping the dispersion for a period of time before use.

Our invention is now illustrated, but in no way limited, by the following examples, in which all parts and percentages are given by weight unless otherwise specified.

EXAMPLE 1

Dimethylaminoethyl methacrylate (47.1 parts) was placed in a stirred reaction vessel fitted with a stirrer and reflux condenser and mixed with benzyl chloride (37.8 parts), benzene (150 parts) and "Topanol" A (trademark of Imperial Chemical Industries Limited for 2,6-ditert. butyl-4-methylphenol) (0.1 part). This mixture was heated under reflux with stirring for one hour, the quaternary ammonium salt so formed separated out from the solution as a white solid and after cooling was removed by filtration.

EXAMPLE 2

A mixture of comers consisting of the quaternary salt (80 parts), as prepared in Example 1, methacrylic acid (25.8 parts) and 2-ethylhexyl acrylate (331 parts) was added to a stirred reaction vessel fitted with a reflux condenser and containing toluene (400 parts) and n-propanol (400 parts). Azodiisobutyronitrile (4 parts) was added and the mixture heated under reflux with stirring. Three further portions (4 parts) of azodiisobutyronitrile were added at three hourly intervals. After an additional three hours the polymerisation was substantially complete. A large excess of aqueous calcium hydroxide solution was added with stirring and the water was removed by azeotropic distillation to yield a 20% solution of the polymer in toluene.

The solution was filtered to remove inorganic solids to give a slightly gelatinous solution. This contained some calcium ions and was used as deflocculating agent A.

EXAMPLE 3

Dimethyl sulphate (43.2 parts) was added slowly to a mixture of 2-methylthioethyl acrylate (50 parts) and benzene (50 parts) in a stirred reaction vessel fitted with a reflux condenser. The mixture was stirred at room temperature for one hour and the resultant sulphonium salt separated out as a white solid and was removed by filtration.

EXAMPLE 4

Example 2 was repeated except that in place of the mixture of comers used in that Example the mixture of comers used was a mixture of the sulphonium salt prepared in Example 3 (48.3 parts), 2-ethylhexyl acrylate (331 parts) and methacrylic acid (25.8 parts). The resultant solution contained 20% polymer in toluene and was used as deflocculating agent B.

EXAMPLE 5

Example 2 was repeated except that in place of the mixture of comers used in that example the mixture of comers used was prepared by the separate, simultaneous addition, into the stirred reaction vessel containing toluene (400 parts) and n-propanol (400 parts), of a solution of allyltriphenylphosphonium bromide (22.7 parts) in n-propanol (100 parts) and of a mixture of methacrylic acid (6.5 parts) and 2-ethylhexylacrylate (83 parts).

The resultant solution contained 20% polymer and was used as deflocculating agent C.

EXAMPLE 6

Example 2 was repeated except that in place of the mixture of comers used in that example, the mixture of comers used was prepared from 2-ethylhexyl acrylate (83 parts), glycidyl methacrylate (16.2 parts) and the quaternary salt (21.2 parts) of dimethylaminoethyl methacrylate and benzyl chloride.

The resultant solution contained 35% polymer in toluene.

EXAMPLE 7

A portion (72 parts) of the polymer solution prepared in Example 6 was added dropwise with rapid stirring to a reaction vessel containing 98% sulphuric acid (5.6 parts). After 15 minutes the mixture was washed with water three times and with aqueous sodium hydroxide solution once. The solution of organic material was dried by azeotropic distillation with toluene. The resultant solution contained 10% w./w. polymer in toluene and was used as deflocculating agent D.

EXAMPLE 8

Example 7 was repeated except that instead of the sulphuric acid used in that example, 85% w./w. phosphoric acid (6.5 parts) was used.

The resultant solution contained 10% w./w. polymer in toluene and was used as deflocculating agent E.

EXAMPLE 9

Example 5 was repeated except that instead of the methacrylic acid used in that example, glycidyl methacrylate (10.7 parts) was used.

A portion of the resultant solution (72 parts), containing 35% polymer in toluene, was reacted with 85% w./w. phosphoric acid (6.5 parts) as described in Example 8.

The resultant solution contained 20% w./w. polymer in toluene and was used as deflocculating agent F.

EXAMPLE 10

Dimethylaminoethyl methacrylate (82 parts) was placed in a stirred reaction vessel fitted with a stirrer and reflux condenser and mixed with chloracetic acid (49 parts), n-propanol (131 parts) and "Topanol" A (0.3 parts). This mixture was heated under reflux and stirred for one hour.

A mixture of 2-ethylhexyl acrylate (322 parts), azodiisobutyronitrile (0.4 parts), acetone (3 parts), and all the solution prepared above, was added to a stirred reaction vessel fitted with a reflux condenser, containing toluene (300 parts) and n-propanol (400 parts). The mixture was heated under reflux.

Three further portions (0.6 parts) of azodiisobutyronitrile were added at three hourly intervals. After an additional 2 hours the polymerization was substantially complete. A slurry of sodium bicarbonate (55 parts) in water (200 parts) was added and the water removed by azeotropic distillation with toluene. The resultant solution contained 30% w./w. polymer in a mixture of toluene and propanol and was used as deflocculating agent G.

EXAMPLE 11

The deflocculating agents A, B, C, D, E, F and G prepared in Examples 2, 4, 5, 7, 8, 9 and 10 respectively were tested as dispersants for "Austiox" R–CR (trademark of Australian Titan Products Ltd. for rutile titanium dioxide) in xylene. The following general procedure was adopted. A mixture of "Austiox" R–CR (80 g.) and deflocculating agent (8 g.) was made up to 100 parts with xylene. This mixture was shaken vigorously using a "Red Devil" (Trademark) paint conditioning machine in a 750 ml. bottle containing 200 g. of 8 mm. glass balls for 30 minutes. The pigment dispersion obtained was assessed for fineness of grind and viscosity. A grading of 10 means that the dispersion was very fine and of low viscosity. A grading of 1 means that the grinding was coarse and the viscosity high. A grading of 0 means the powder was undispersed. Any dispersant giving a grading of more than 5 has excellent dispersant properties. The control dispersion was one made up without using any dispersant. The results are given in Table 1.

TABLE 1

| Deflocculating agent: | Grading |
|---|---|
| Control | 0 |
| A | 9 |
| B | 7 |
| C | 7 |
| D | 6 |
| E | 6 |
| F | 5 |
| G | 8 |

EXAMPLE 12

The deflocculating agents A, B, C, D, E, F and G prepared in Examples 2, 4, 5, 7, 8, 9 and 10 respectively, were tested as dispersants for carbon black in xylene. The same procedure was carried out as in Example 11 except that the dispersion contained 35 g. of "Philblack" 55 (trademark of Phillips Petroleum Co.) with 3.56 g. of the deflocculating agent made up to 100 parts with xylene. The results are given in Table 2.

TABLE 2

| Deflocculating agent: | Grading |
|---|---|
| Control | 0 |
| A | 9 |
| B | 7 |
| C | 7 |
| D | 6 |
| E | 7 |
| F | 3 |
| G | 9 |

EXAMPLE 13

2 - Ethylhexyl acrylate (265.2 parts), styrene (99.6 parts) dimethylaminoethyl methacrylate (37.7 parts), methacrylic acid (20.6 parts), toluene (440 parts), benzene (440 parts) were placed in a stirred reaction vessel fitted with a stirrer and reflux condenser. This mixture was brought to just below reflux temperature and azodiisobutyronitrile (4.2 parts) stirred in toluene (40 parts) was added. The mixture was heated under reflux and portions of azodiisobutyronitrile (0.8 part) were added every ½ hour for 6 hours when polymerisation was substantially complete. This solution was used as deflocculating agent H.

EXAMPLE 14

A portion (100 parts) of the polymer solution prepared in Example 13 was stirred with a normal solution of sodium hydroxide (17.1 ml.) heated under reflux for 1 hour. The water was removed by azeotropic distillation to yield deflocculating agent I.

EXAMPLE 15

Example 14 was repeated except that a slurry of calcium hydroxide (1.26 parts) in water (40 parts) was used in place of the sodium hydroxide. The resulting solution was used as deflocculating agent J.

EXAMPLE 16

A mixture of 4-vinyl pyridine (19.7 parts), 2-ethylhexyl acrylate (207 parts), styrene (78 parts), methacrylic acid (16.2 parts), azodiisobutyronitrile (3.3 parts), acetone (20 parts) and n-propanol (50.0 parts) was added over 3 hours to a stirred refluxing mixture of n-propanol (340 parts) and toluene (340 parts) contained in a reaction vessel. Portions of azodiisobutyronitrile (0.6 part) were added to the refluxing mixture every half hour for 5 hours, when polymerisation was substantially complete. The n-propanol was then removed by azeotropic distillation with toluene to yield a solution containing 30% w./w. polymer in toluene which was used as deflocculating agent K.

EXAMPLE 17

A portion (100 parts) of the polymer solution prepared in Example 16 was stirred with a slurry of calcium hydroxide (1.30 parts) in water (40 parts) at reflux for 1 hour. The water was removed by azeotropic distillation to yield deflocculating agent L.

EXAMPLE 18

Example 13 was repeated except that in place of dimethylaminoethyl methacrylate, 2-hydroxy propyl methacrylate (34.6 parts) was used. The resultant solution was used as deflocculating agent M.

EXAMPLE 19

Example 16 was repeated except that in place of 4-vinyl pyridine, dimethylaminoethyl methacrylate (29.5 parts) was used, and in place of methacrylic acid, itaconic acid (24.4 parts) was used, the latter being dissolved in the n-propanol before being added to the reaction vessel. The resultant polymer solution was used as deflocculating agent N.

EXAMPLE 20

The deflocculating agents H, I, J and L, prepared in Examples 13, 14, 15 and 17 respectively, were tested as dispersants for carbon black as in Example 12. The results are given in Table 3.

TABLE 3

| Deflocculating agent: | Grading |
|---|---|
| H | 7 |
| I | 7 |
| J | 10 |
| L | 8 |

EXAMPLE 21

The deflocculating agents H, K, M and N prepared in Examples 13, 16, 18 and 19 respectively, were tested as dispersants for various pigments by grinding the pigment with deflocculating agent, inorganic base and sufficient toluene to make up to 100 parts. Ingredients used and results obtained were as shown in Table 4.

TABLE 4

| Pigment | Parts | Solid deflocculating Agent | Parts | Inorganic base | Parts | Grading |
|---|---|---|---|---|---|---|
| "Philblack" 55 | 35 | H | 3.5 | Ca(OH)$_2$ | 0.15 | 10 |
| Do | 35 | H | 3.5 | Ba(OH)$_2$ 8H$_2$O | 0.63 | 10 |
| Do | 35 | K | 3.5 | Ca(OH)$_2$ | 0.15 | 10 |
| Do | 35 | M | 3.5 | Ca(OH)$_2$ | 0.16 | 7 |
| Do | 35 | N | 3.5 | Ca(OH)$_2$ | 0.14 | 10 |
| "Austiox" R-CR | 80 | H | 1.2 | Ca(OH)$_2$ | 0.05 | 10 |
| Chrome Oxide Green GNA | 80 | H | 1.2 | Ca(OH)$_2$ | 0.05 | 10 |
| Supra Middle Chrome GA | 80 | H | 1.2 | Ca(OH)$_2$ | 0.05 | 10 |
| "Fastel" Violet R, Supra* | 35 | H | 3.5 | Ca(OH)$_2$ | 0.15 | 10 |
| "Fastel" Pink R, Supra* | 35 | H | 3.5 | Ca(OH)$_2$ | 0.15 | 10 |
| "Monastral" Fast Blue BGA* | 35 | H | 7.0 | Ca(OH)$_2$ | 0.30 | 5 |

*"Fastel" and "Monastral" are registered trademarks of Imperial Chemical Industries Ltd.

EXAMPLE 22

A typical gravure ink was made up using a 35% w./w. dispersion of "Philblack" 55 in a toluene which was made using the recipe given in Table 4, first line. This dispersion was was ground until the average particle size was under one micron.

A portion of the ground dispersion (17.15 parts) was added slowly with high speed stirring to a mixture of a 60% w./w. zinc rosinate solution in toluene (40 parts) and a 60% w./w. zinc rosinate solution in "Boralene" 1127 (trademark) (40 parts). After thorough mixing toluene (2.85 parts) was added. This ink was then drawn down on paper and the latter was compared with a drawdown of an ink made in the normal manner with no deflocculating agent. Compared with the standard ink the "dispersion" ink was at least 40% stronger in colour development.

EXAMPLE 23

A further portion of the dispersion prepared in Example 22 was taken, precipitated into a large volume of acetone and separated by filtration. The "Philblack" 55 pigment, coated with deflocculating agent, was then dried. A portion of this pigment (35 parts) was then ground with toluene (65 parts). The resulting dispersion had a rating of 10.

We claim:

1. A dispersion comprising a pigment, a dispersion liquid selected from aliphatic and aromatic hydrocarbons and mixtures thereof, and a polymeric deflocculating agent which is an addition copolymer comprising from 99 to 50 mole percent of mer units derived from an ethylenically unsaturated monomer containing a solubilizing group Q such that the compound QH is soluble in the dispersion liquid to the extent of at least 20% by weight and a total of from 1 to 50 mole percent of mer units carrying groups of internal salt structure, the said groups of internal salt structure being formed from mer units selected from the group consisting of:

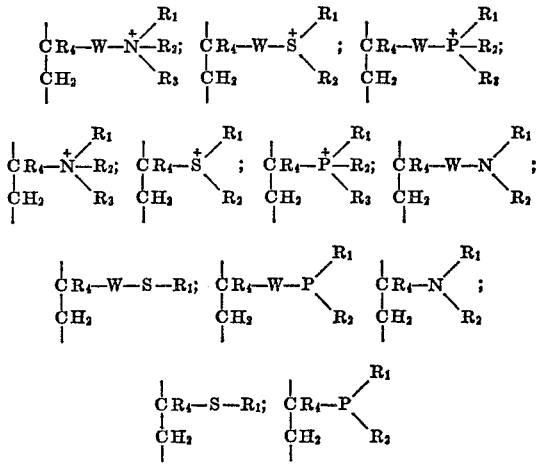

in combination with mer units selected from the group consisting of:

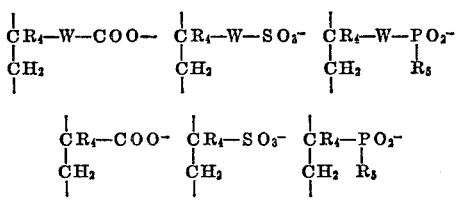

wherein W is an alkyene group containing from 1 to 3 carbon atoms, $R_1$, $R_2$ and $R_3$ are separately selected from hydrogen, alkyl, aralkyl and aryl groups containing from to seven carbon atoms, $R_4$ is selected from hydrogen and alkyl groups containing from one to seven carbon atoms, and $R_5$ is $R_6$ or $-OR_6$, $R_6$ being selected from alkyl and aryl groups containing from one to seven carbon atoms, and the polymeric deflocculating agent is present in an amount in the range of from 0.001 g. to 0.05 g. expressed as solid polymer for every 10 square metres of pigment surface area.

2. A dispersion according to claim 1 wherein the solubilising group Q is an alkyl group containing from 6 to 20 carbon atoms.

3. A dispersion according to claim 1 wherein the solubilising group is phenyl or benzyl.

4. A dispersion according to claim 1 comprising from 0.05 to 5% w./w. inclusive of water.

5. A dispersion according to claim 4 comprising from 0.5 to 2% w./w. inclusive of water.

6. A dispersion according to claim 1 wherein the polymeric deflocculating agent is a copolymer of 2-ethylhexylacrylate, dimethylaminoethyl methacrylate and acrylic acid.

7. A process of manufacturing the pigment dispersion of claim 1 which comprises grinding a mixture comprising a pigment, a dispersion liquid selected from aliphatic and aromatic hydrocarbons and mixtures thereof and, in an amount of from 0.001 g. to 0.05 g. expressed as solid polymer for every 10 square meters of pigment surface area, a polymeric deflocculating agent which is an addition copolymer comprising from 99 to 50 mole percent of mer units derived from an ethylenically unsaturated monomer containing a solubilizing group Q such that the compound QH is soluble in the dispersion liquid to the extent of at least 20% by weight and a total of from 1 to 50 mole percent of mer units carrying groups of internal salt structure, the said groups of internal salt structure being formed from mer units selected from the group consisting of:

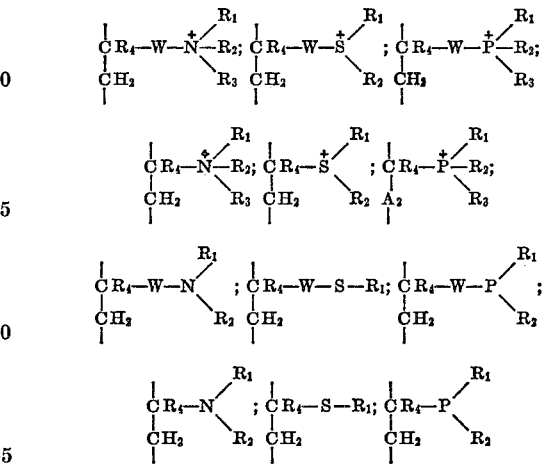

in combination with mer units selected from the group consisting of:

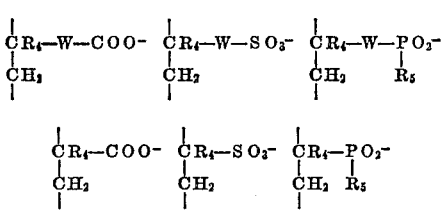

wherein W is an alkylene group containing from 1 to 3 carbon atoms, $R_1$, $R_2$ and $R_3$ are separately selected from hydrogen, alkyl, aralkyl and aryl groups containing from one to seven carbon atoms, $R_4$ is selected from hydrogen and alkyl groups containing from one to seven atoms, and $R_5$ or $-OR_6$, $R_6$ being selected from alkyl and aryl groups containing from one to seven carbon atoms.

8. A process according to claim 7 wherein the mixture comprises, in addition to the pigment, the dispersion liquid and the polymeric deflocculating agent, an inorganic base selected from the group consisting of alkaline earth metal hydroxides, alkali metal hydroxides and ammonium hydroxide.

9. A process according to claim 8 wherein the mixture comprises substantially equimolar amounts of the inorganic base and the polymeric deflocculating agent.

10. A process according to claim 7 wherein the polymeric deflocculating agent is coated onto the pigment prior to grinding.

11. A process according to claim 8 wherein the polymeric deflocculating agent is coated onto the pigment prior to grinding.

References Cited

UNITED STATES PATENTS

| | | | |
|---|---|---|---|
| 2,138,763 | 11/1938 | Graves | 260—89.7 N |
| 2,282,006 | 5/1942 | Sloan | 106—308 N |
| 2,654,729 | 10/1953 | Price | 260—89.7 N |
| 2,897,200 | 7/1959 | Maeder et al. | 260—89.7 N |
| 3,170,901 | 2/1965 | Melamed et al. | 260—89.7 N |
| 3,294,764 | 12/1966 | Pellon et al. | 260—80 PS |
| 3,413,255 | 11/1968 | Gardon et al. | 260—33.6 |

DELBERT E. GANTZ, Primary Examiner

S. L. BERGER, Assistant Examiner

U.S. Cl. X.R.

106—308 N